(12) United States Patent
Hsu

(10) Patent No.: US 9,985,840 B2
(45) Date of Patent: May 29, 2018

(54) CONTAINER TRACER

(71) Applicant: Arista Networks, Inc., Santa Clara, CA (US)

(72) Inventor: Fred Lo-Tze Hsu, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 183 days.

(21) Appl. No.: 15/182,289

(22) Filed: Jun. 14, 2016

(65) Prior Publication Data

US 2017/0359223 A1    Dec. 14, 2017

(51) Int. Cl.
*H04L 12/24* (2006.01)
*H04L 29/06* (2006.01)
*G06F 17/30* (2006.01)

(52) U.S. Cl.
CPC ........ *H04L 41/12* (2013.01); *G06F 17/30477* (2013.01); *G06F 17/30554* (2013.01); *H04L 41/085* (2013.01); *H04L 67/42* (2013.01)

(58) Field of Classification Search
USPC ......................... 709/203, 223, 224, 220, 245
See application file for complete search history.

(56) References Cited

U.S. PATENT DOCUMENTS

| 8,396,059 | B1* | 3/2013 | Kreeger | H04Q 11/00 370/386 |
| 2005/0216282 | A1* | 9/2005 | Chen | G06F 9/54 717/108 |
| 2009/0001162 | A1* | 1/2009 | Asher | G06Q 10/08 235/385 |
| 2016/0342651 | A1* | 11/2016 | Bendel | G06F 17/30463 |

* cited by examiner

*Primary Examiner* — Jude Jean Gilles
(74) *Attorney, Agent, or Firm* — Chamberlain Hrdlicka

(57) ABSTRACT

In general, embodiments of the invention relate to a method and system for presenting container tracing information (CTI). More specifically, CTI represents the union of container-server mappings, provided by a third-party container management system (CMS), and server-port mappings obtained by a network element using neighbor information. As a solution, CTI may be useful to administrators who require locating containers in a network or datacenter for troubleshooting.

20 Claims, 13 Drawing Sheets

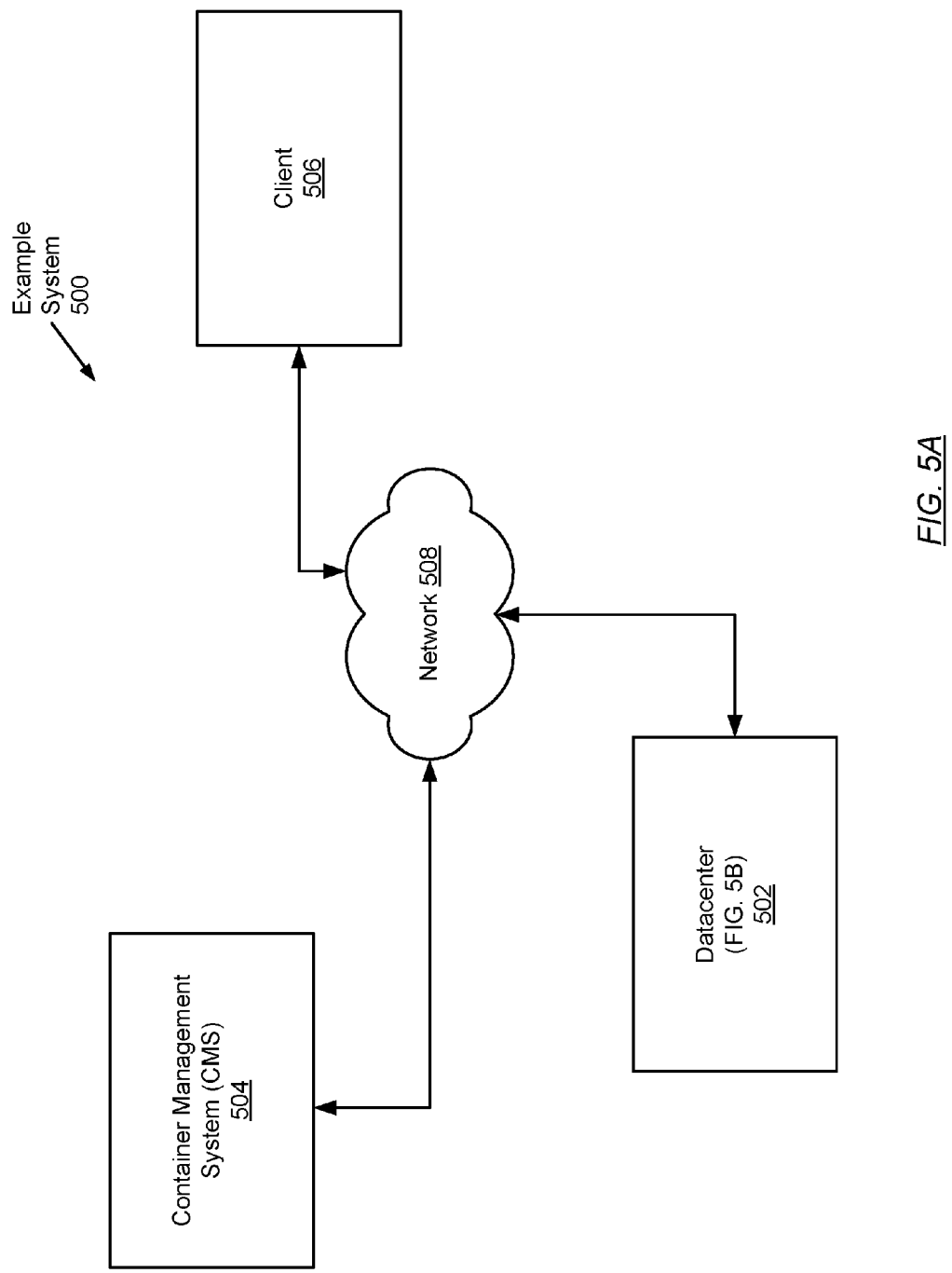

Example Container-Server (CS) Table 530

| CS Table Entry | | | |
|---|---|---|---|
| CS Table Entry 1 532A | C0 ID 534A | S1 ID 536A | Bridge B1 ID 538A |
| CS Table Entry 2 532B | C1 ID 534B | S1 ID 536A | Bridge B2 ID 538B |
| CS Table Entry 3 532C | C2 ID 534C | S3 ID 536C | Bridge B3 ID 538C |
| CS Table Entry 4 532D | C3 ID 534D | S4 ID 536D | Bridge B4 ID 538D |
| CS Table Entry 5 532E | C4 ID 534E | S5 ID 536E | Bridge B5 ID 538E |
| CS Table Entry 6 532F | C5 ID 534F | S6 ID 536F | Bridge B6 ID 538F |
| CS Table Entry 7 532G | C6 ID 534G | S7 ID 536G | Bridge B7 ID 538G |
| CS Table Entry 8 532H | C7 ID 534H | S8 ID 536H | Bridge B8 ID 538H |
| CS Table Entry 9 532I | C8 ID 534I | S8 ID 536H | Bridge B9 ID 538I |
| CS Table Entry 10 532J | C9 ID 534J | S8 ID 536H | Bridge B8 ID 538H |

*FIG. 5C*

Example Server-Port (SP) Table 1 (for NE1) 540A

| SP Table Entry 1 542A | S1 ID 536A — Port P1 ID 544A |
| SP Table Entry 2 542B | S2 ID 536B — Port P2 ID 544B |
| SP Table Entry 3 542C | S3 ID 536C — Port P3 ID 544C |

*FIG. 5D*

Example Server-Port (SP) Table 2 (for NE2) 540B

| SP Table Entry 4 542D | S4 ID 536D — Port P4 ID 544D |
| SP Table Entry 5 542E | S5 ID 536E — Port P5 ID 544E |
| SP Table Entry 6 542F | S6 ID 536F — Port P6 ID 544F |

*FIG. 5E*

CONTAINER TRACER

BACKGROUND

Containers are compartmentalized and isolated application environments that execute on underlying hardware such as servers.

SUMMARY

In general, in one aspect, embodiments of the invention relate to a network element. The network element includes a data plane comprising a plurality of ports, a control plane operatively connected to the data plane, wherein the control plane comprises a discovery agent, and a management plane operatively connected to the control plane, wherein the management plane comprises a container tracing service (CTS) programmed to receive, at a first port of the plurality of ports, a query from a client, obtain, using a second port of the plurality of ports, a first set of mappings from a container management system (CMS), obtain a second set of mappings from the discovery agent, generate container tracing information (CTI) using the first set of mappings and the second set of mappings, and present, using the first port of the plurality of ports, the CTI to the client.

In general, in one aspect, embodiments of the invention relate to a method for presenting container tracing information (CTI) associated with a network element. The method includes receiving a query from a client, obtaining a first set of mappings from a container management system (CMS), obtaining a second set of mappings from a discovery agent, generating the CTI using the first set of mappings and the second set of mappings, and presenting the CTI to the client.

In general, in one aspect, embodiments of the invention relate to a non-transitory computer readable medium comprising computer readable program code, which when executed by a processor enables the processor to receive a query from a client, obtain a first set of mappings from a container management system (CMS), obtain a second set of mappings from a discovery agent, generate container tracing information (CTI) using the first set of mappings and the second set of mappings, and present the CTI to the client.

Other aspects of the invention will be apparent from the following description and the appended claims.

BRIEF DESCRIPTION OF DRAWINGS

FIG. 5A shows an example system in accordance with one or more embodiments of the invention.

FIG. 5C shows an example container-server (CS) table in accordance with one or more embodiments of the invention.

FIG. 5D shows an example server-port (SP) table for a first network element in accordance with one or more embodiments of the invention.

FIG. 5E shows an example server-port (SP) table for a second network element in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for presenting container tracing information (CTI). More specifically, embodiments of the invention enable network or datacenter administrators to determine which container(s) are attached to which network element ports. CTI represents the union of container-server mappings, provided by a third-party container management system (CMS), and server-port mappings obtained by a network element using neighbor information. As a solution, CTI may be useful to administrators who require locating containers in a network or datacenter for troubleshooting.

Figure 1:
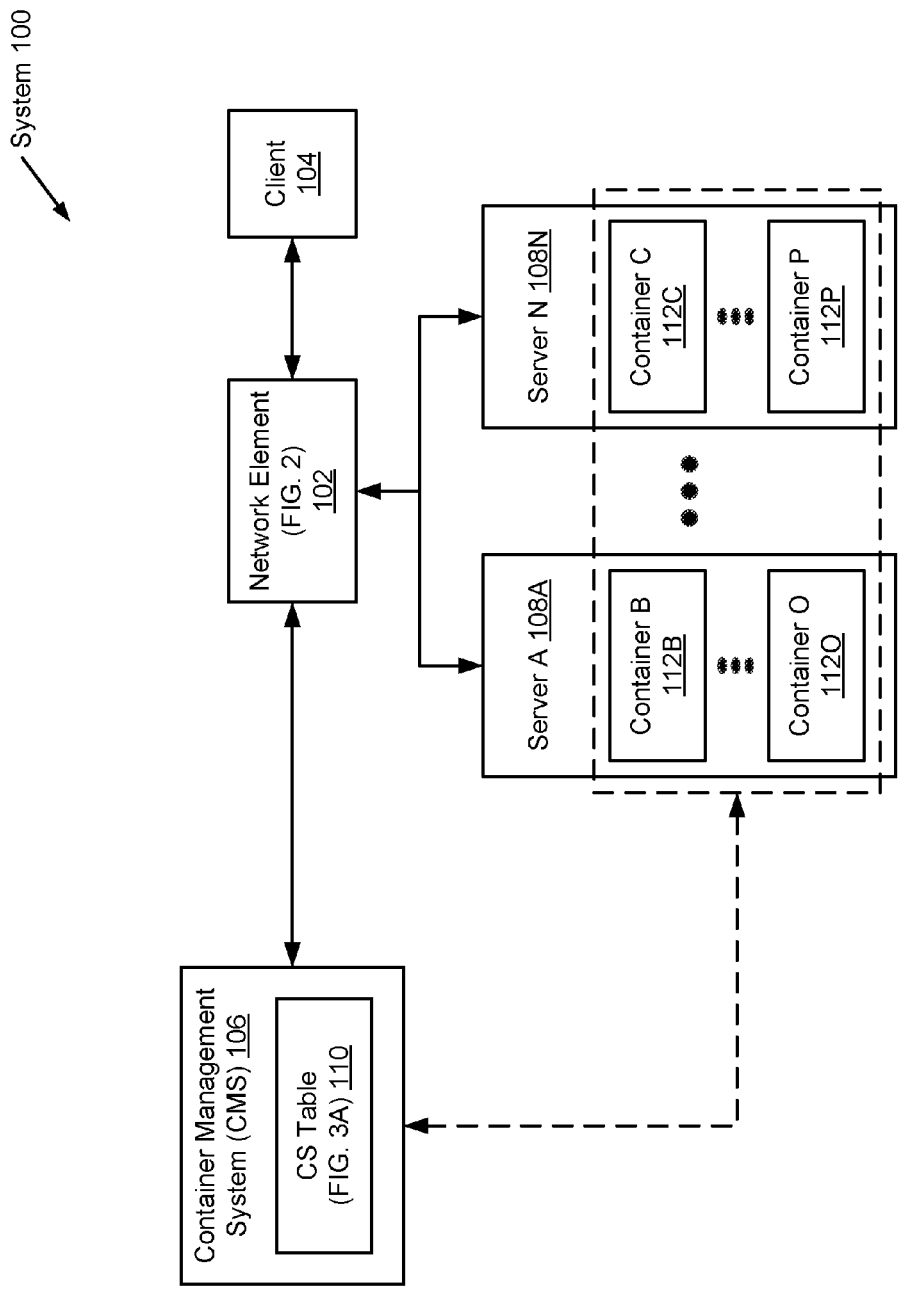
FIG. 1 shows a system in accordance with one or more embodiments of the invention.

FIG. 1 shows a system in accordance with one or more embodiments of the invention. The system (100) includes a network element (102) operatively connected to a client (104), a container management system (CMS) (106), and one or more servers (108A, 108N). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., network elements, servers, etc.) (not shown) that facilitate communication between the aforementioned components. The aforementioned components may communicate with each other using any combination of wired and/or wireless communication protocols.

In one embodiment of the invention, a network element (102) is a physical device that includes persistent storage, memory (e.g., random access memory (RAM)), one or more processors (e.g., integrated circuits) (including a switch chip), and two or more physical ports. Examples of a network element may include, but is not limited to, a switch, a router, a multilayer switch, or any other physical device programmed to implement one or more network communication protocols. In one embodiment of the invention, the switch chip is hardware that determines which egress port on a switch to forward bridging packets (e.g., media access control (MAC) frames). The switch chip may include egress and ingress ports that may connect to ports on the network element. Each port may or may not be connected to another network infrastructure component on a network. The network element may be programmed to receive packets via the ports and determine whether to (i) drop the packet, (ii) process the packet in accordance with one or more embodiments of the invention, and/or (iii) send the packet, based on the processing, out another port of the network element.

How the network element makes the determination of whether to drop the packet, and/or send the packet to another network infrastructure component (e.g., a network element, a server, etc.) on the network depends, in part, on whether the network element is a layer-2 (L2) switch or a layer-3 (L3) switch (also referred to as a multilayer switch), which may perform at least some functions of a router. If the network element is operating as a L2 switch, the network element uses a destination bridging address (e.g., a destination MAC address) along with a forwarding table to determine out of which port to send the packet. If the network element is operating as a L3 switch, the network element uses a destination routing address (e.g., a destination Internet Protocol (IP) address) along with a routing table to determine out of which port to send the packet, and includes the ability to write the bridging address of the next network element to receive the packet in place of its own bridging address (which the last network element to send the packet wrote) in the L2 information encapsulating the packet. If the network element is a multilayer switch, the multilayer switch includes functionality to process packets using both bridging (e.g., MAC) and routing (e.g., IP) addresses.

In one embodiment of the invention, the persistent storage in the network element may include any type of non-transitory computer readable medium that includes instructions, which when executed by one or more processors in the network element, enable the network element to perform the functions described in accordance with one or more embodiments of the invention (see e.g., FIGS. 2-5B). Additional details about the network element are described below with respect to FIG. 2.

In one embodiment of the invention, a client (104) is any type of computing system (see e.g., FIG. 6) that is programmed to interact with the network element (102). Specifically, in one embodiment of the invention, the client includes functionality to: (i) submit queries to a network element; and (ii) receive responses, from the network element, that include container tracing information (CTI) (described below). By way of an example, a client may be a desktop computer operated by a network or datacenter administrator.

In one embodiment of the invention, a container management system (CMS) (106) is a platform for the centralized management and deployment of containers in a network or datacenter. In one embodiment of the invention, the CMS may include hardware, software, firmware, and any combination thereof. In one embodiment of the invention, the CMS is a third-party system. Further, the CMS includes functionality to: (i) track the creation and deletion (and therefore manage the deployment) of containers in a network or datacenter; (ii) generate, manage/update, and store a container-server (CS) table (discussed below); (iii) receive queries or requests from one or more network elements; and (iv) provide the aforementioned CS table, in response to queries or requests, to one or more network elements. Further, in one embodiment of the invention, the CMS (106) includes functionality to accept subscription requests from entities (e.g., network elements) that want to receive publication (i.e., notification) of any changes to, updates of, or migration of containers in a network or datacenter managed by the CMS. Examples of a CMS include, but are not limited to, Kubernetes from Google, Mesos from the Apache® Software Foundation, and Swarm from Docker, Inc.

In one embodiment of the invention, the CMS (106) may include a data repository (not shown). The data repository may be any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. The data repository includes functionality to store a container-server (CS) table (110). In brief, the CS table includes mappings that link a container to a server (e.g., the server upon where the container is executing) in the network or datacenter. Additional details about the CS table are described below with respect to FIG. 3A.

Figure 6:
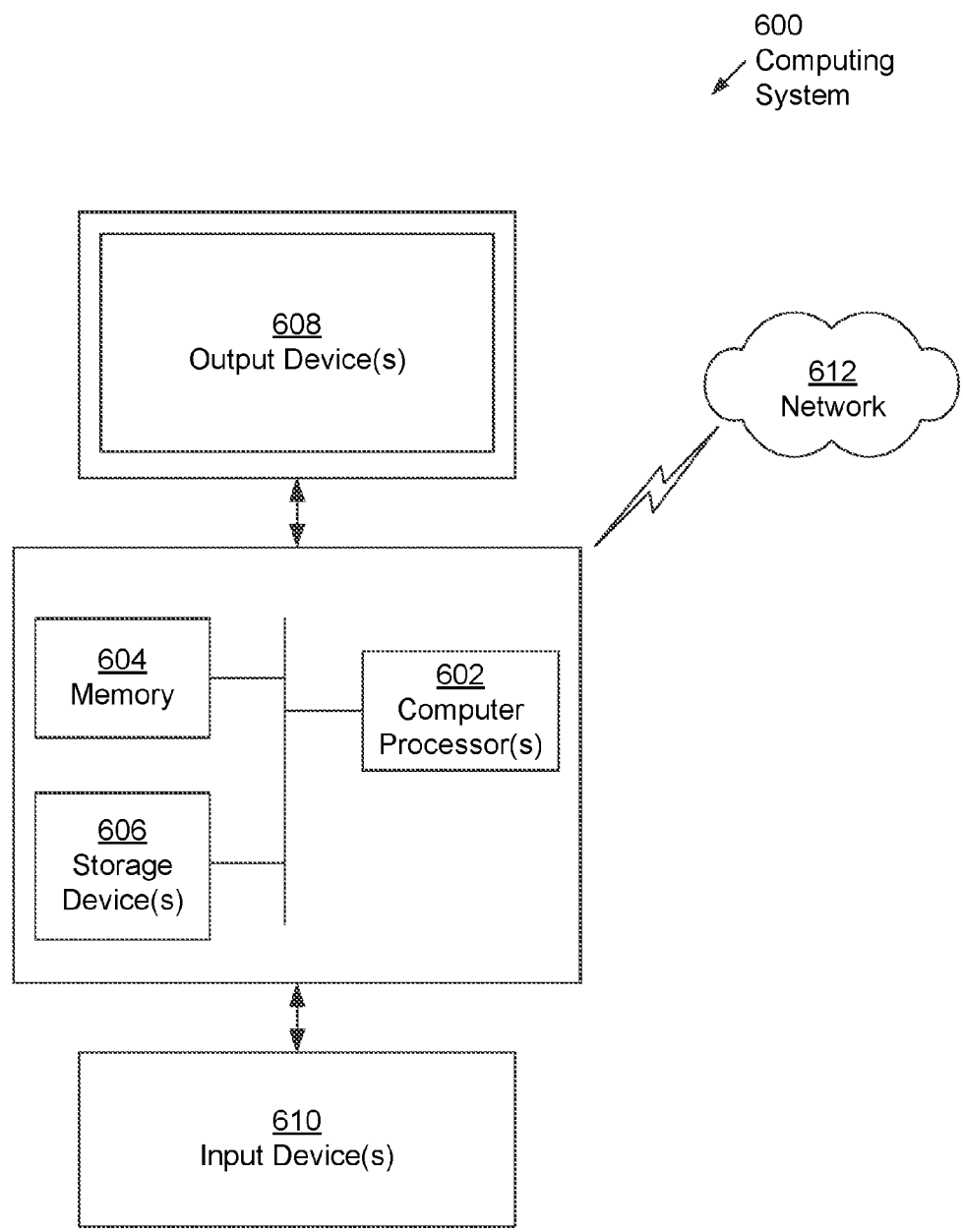
FIG. 6 shows a computing system in accordance with one or more embodiments of the invention.

In one embodiment of the invention, a server (also referred to as a host) (108A, 108N) is a computing system (see e.g., FIG. 6). The server may include any type of physical system that is programmed to generate, send, receive, and/or process bridging packets (e.g., media access control (MAC) frames) either locally or over a network using software and computer hardware. Examples of types of servers include, but are not limited to, virtualized servers, database servers, dynamic host configuration protocol (DHCP) servers, application servers, file servers, print servers, and mail servers.

In one embodiment of the invention, a server (108A, 108N) may host or be programmed to execute one or more virtual switches (or vSwitches) (not shown). A vSwitch is a software construct that implements network element functionality, similar to the functionality of the network element described above (and to be described below with respect to FIG. 2). In one embodiment of the invention, the vSwitch is implemented virtually by a hypervisor and/or operating system executing on the server. In one embodiment of the invention, a vSwitch provides network access to one or more containers (112B, 112O, 112C, 112P) (described below). In addition to downlinks to one or more containers executing on a server (108A, 108N), the vSwitch may include one or more uplinks to one or more network elements (e.g., network element (102)) via a network interface card (not shown) of the server. In one embodiment of the invention, the vSwitch includes functionality to implement network policies for received or sent packets.

In one embodiment of the invention, in hosting a vSwitch, a server may provide the vSwitch with resources that have been allocated for use by the vSwitch, as well as scheduling time and/or space of the resources to execute instructions generated by a vSwitch. In one embodiment of the invention, the server includes functionality to translate instructions generated by a vSwitch into instructions that can be understood by the operating system, hypervisor, and/or underlying hardware of the server. As mentioned above, in one embodiment of the invention, the server may include a hypervisor (not shown). A hypervisor is computer software that includes the ability to create, execute, and, at least in part, manage vSwitches executing on the server. In other embodiments of the invention, the server includes an operating system (e.g., a Linux-based or Windows-based operating system) on which a vSwitch executes.

In one embodiment of the invention, a server (108A, 108N) may be programmed to provide computing resources for use by one or more containers (112B, 112O, 112C, 112P), which may be executing on the server. A container is an isolated, lightweight virtualization mechanism (or software construct) that allows for the running of an application or an operating system within the container without the overhead of executing a hypervisor (as is needed for executing a vSwitch or virtual machines on underlying hardware). Minimal overhead is generated by containers because: (i) containers share the same operating system kernel with other containers and the underlying host (e.g., server); and (ii) containers (unlike virtual machines) do not need to emulate physical hardware. In one embodiment of the invention, a container may be implemented virtually by the host operating system. In one embodiment of the invention, a container may provide a more efficient, faster, and more portable mechanism for managing application development and deployment across a network or datacenter.

The invention is not limited to the system shown in FIG. 1. More specifically, while the system shown in FIG. 1 includes a single network element, embodiments of the invention may be implemented using multiple network elements, each directly-attached to their own set of servers. Additionally or alternatively, embodiments of the invention may be implemented using virtual machines rather than containers, or a combination of virtual machines and containers.

Figure 2:
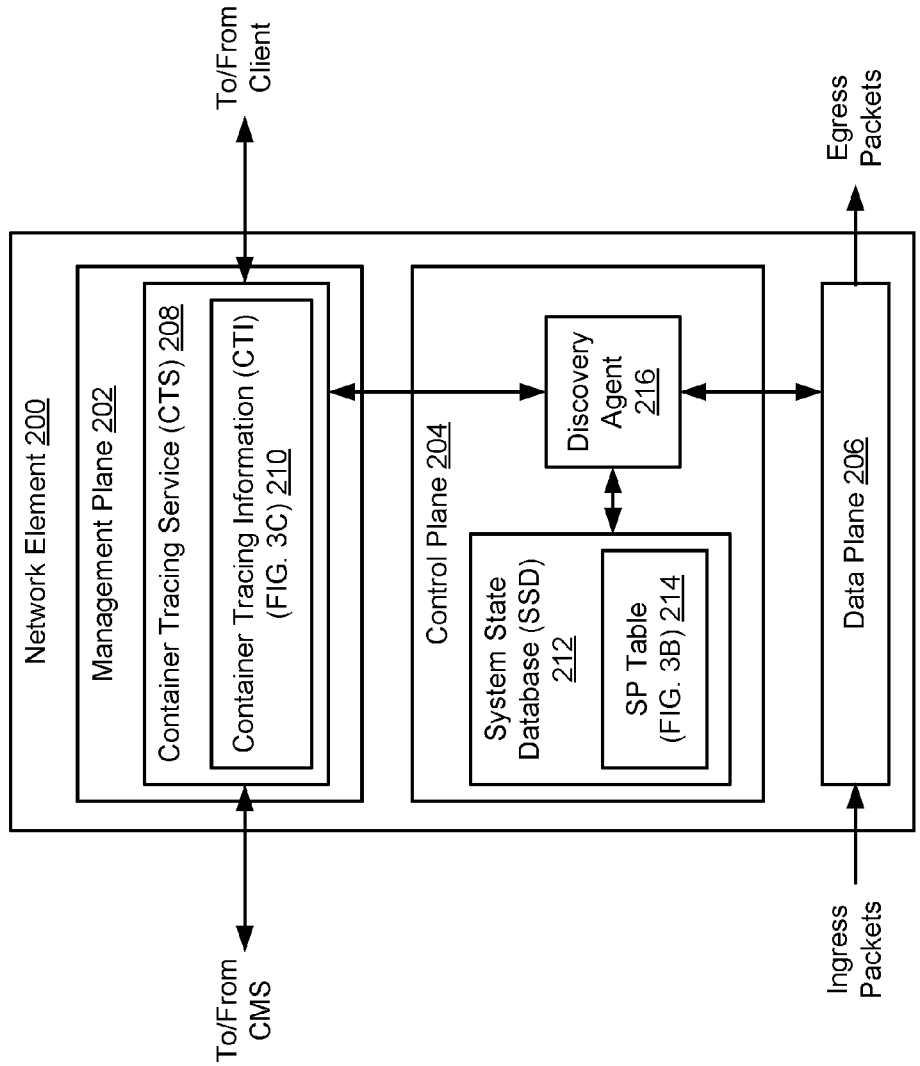
FIG. 2 shows a network element in accordance with one or more embodiments of the invention.

FIG. 2 shows a network element in accordance with one or more embodiments of the invention. The network element (200) includes a management plane (202), a control plane (204), and a data plane (206). Each of these components are described below.

In one embodiment of the invention, the management plane (202) is a portion of the architecture employed in the network element (200). The management plane may be implemented using hardware, software, firmware, and/or any combination thereof. In one embodiment of the invention, the management plane includes functionality to configure the network element. More specifically, the management plane includes a command line interface (CLI) and/or a graphical user interface (GUI) through which network administrators may interact with in order to configure the network element (or particularly, to configure what the control plane of the network element should do). In one embodiment of the invention, the management plane also includes functionality to receive information (e.g., state information) from the control plane (204).

In one embodiment of the invention, the management plane (202) includes a container tracing service (CTS) (208). The CTS may be implemented using hardware, software, firmware, and/or any combination thereof. In one embodiment of the invention, the CTS may perform embodiments of the invention (see e.g., FIG. 4A) in order to provide administrators the location of containers deployed throughout a network or datacenter. Subsequently, the CTS (208) includes functionality to: (i) receive queries from one or more clients; (ii) obtain container-server (CS) mappings from the CMS; (iii) obtain server-port (SP) mappings from the discover agent (216); (iv) generate container tracing information (CTI) using the CS mappings and the SP mappings; (v) store the CTI in memory or storage dedicated to the CTS; and (vi) present, or transmit, the CTI to the one or more clients.

In one embodiment of the invention, the container tracing service (CTS) (208) stores and/or manages the storage of container tracing information (CTI) (210). In one embodiment of the invention, CTI unions the CS mappings (obtained from the CMS) and SP mappings (obtained from the discovery agent (216)) to derive at information useful to administrators for locating containers deployed in a network or datacenter. In another embodiment of the invention, CTI may also allow network elements to provision network resources based on the containers attached to the network elements. Additional details about CTI is described below with respect to FIG. 3C.

In one embodiment of the invention, the control plane (204) is another portion of the architecture employed in the network element (200). The control plane may be implemented using hardware, software, firmware, and/or any combination thereof. In one embodiment of the invention, the control plane includes functionality to manage the overall operation of the network element. More specifically, the control plane includes functionality to manage the operation of the data plane (including programming of the forwarding table (not shown)). The control plane may also include functionality to gather control plane information and to provide this information to the management plane (202). In one embodiment of the invention, control plane information may include, but is not limited to, state information (discussed below) pertaining to the network element, neighbor information obtained/generated by the discover agent (216), and other network element and/or network topology information. Additional and/or alternative control plane information may be provided and/or exist without departing from the invention.

In one embodiment of the invention, the control plane (204) includes a system state database (SSD) (212). The SSD may be implemented using any combination of shared and non-shared memory. In one embodiment of the invention, the SSD stores the current state of the network element (e.g., all values in all data structures used by any of the network element agents (e.g., the discovery agent (216)), which may be stored in the SSD). The SSD may include the values of all variables and/or parameters that are currently specified in the network element. In one embodiment of the invention, the SSD stores the aforementioned information in records within the SSD. The specific content of the records in the SSD may vary based on the implementation of the invention. Accordingly, a record within the SSD may include all, some, or none of the following: (i) the name of the variable (or name of the parameter); (ii) the current value of the variable (or parameter); and (iii) a timestamp indicating when the record was created (or last modified). Additionally, the SSD (212) may store other and/or different information about the current state of the network element without departing from the invention. While the SSD shown in FIG. 2 is shown as a single entity, in other embodiments of the invention, various portions of the SSD may be stored in different locations within the network element.

In one embodiment of the invention, the state information stored in the SSD (212) includes the server-port (SP) table (214). In short, the SP table includes mappings that link a server to a physical port of the network element (e.g., network connectivity information (NCI)). Additional details about the SP table are discussed below with respect to FIG. 3B.

In one embodiment of the invention, the control plane (204) includes one or more network element agents (not shown), such as the discovery agent (216). In one embodiment of the invention, each network element agent implements one or more protocols, processes, and/or services of the network element (200). Examples of other network element agents found within the control plane include, but are not limited to, a command line interface (CLI) agent, a routing information base (RIB) agent, a forwarding information base (FIB) agent, and a simple network management protocol (SNMP) agent. In one embodiment of the invention, each network element agent includes functionality to access various portions of the SSD (212) in order to obtain relevant portions of the state of the network element in order to perform various functions. In addition, each network element agent includes functionality to update the state of the network element by writing new and/or updated values in the SSD.

In one embodiment of the invention, the discovery agent (216) includes functionality to perform embodiments of the invention (see e.g., FIG. 4B) in order to provide NCI (e.g., the SP table (214)) to the CTS (208). Accordingly, the discovery agent (216) includes functionality to: (i) receive queries or requests from the CTS; (ii) access the SSD (212) to determine whether or not the SSD includes the SP table (or mappings) (214); (iii) collect and process ingress link layer discovery protocol (LLDP) and/or Cisco Discovery Protocol (CDP) packets from the data plane (206) to generate SP mappings; (iv) generate and provide egress LLDP and/or CDP packets to neighboring network elements; (v) obtain and/or store SP mappings from/in the SSD; and (vi) provide the SP mappings to requesting entities, such as the CTS (210).

In one embodiment of the invention, the data plane (206) is another portion of the architecture employed in the network element (200). The data plane may be implemented using hardware, software, firmware, and/or any combination thereof. In one embodiment of the invention, the data plane includes functionality to receive packets (denoted as ingress packets) via ports (not shown), process the packets, and, as appropriate, transmit packets (denoted as egress packets) via the ports towards a destination. In one embodiment of the invention, at least a portion of the ingress packets may be link layer discovery protocol (LLDP) or Cisco Discovery Protocol (CDP) packets. The data plane (206) also includes functionality to gather data plane information and to provide this data plane information to the control plane (204). In one embodiment of the invention, data plane information includes, but is not limited to, network usage data, flow information based on the sampling of packets received by the data plane, information related to queue depths on ingress and egress buffers (not shown) in the data plane, and other data traffic statistics. Additional and/or alternative data plane information may be provided and/or exist without departing from the invention.

Figure 3A:
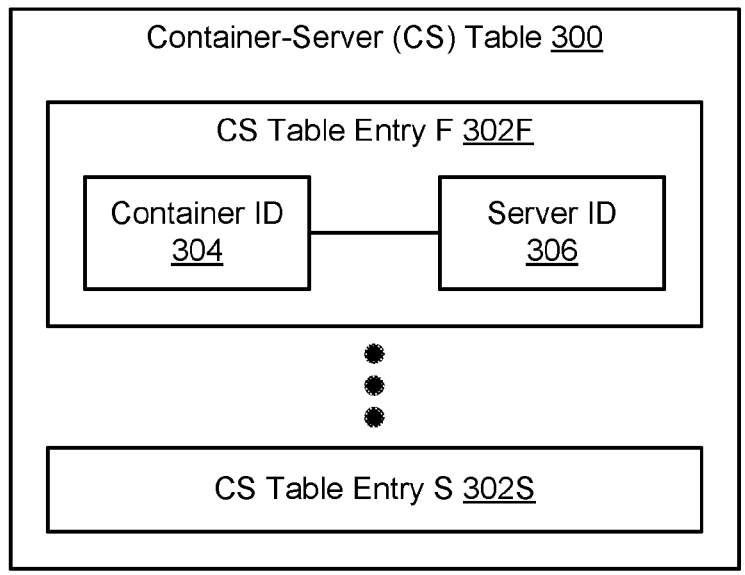
FIG. 3A shows a container-server (CS) table in according with one or more embodiments of the invention.

FIG. 3A shows a container-server (CS) table in accordance with one or more embodiments of the invention. The CS table (300) may be implemented in hardware, software, or any combination thereof. Moreover, the CS table may be a database that includes entries, which include mappings between a container and a server. Specifically, in one embodiment of the invention, a mapping between a container and a server may be used to identify which containers are executing on which servers within a network or datacenter. In view of this, the CS table includes one or more CS table entries (302F, 302S). In one embodiment of the invention, a CS table entry may be programmed by the container management system (CMS) based on the allocation or deallocation of containers. That is to say, the CS table (300) may be updated in response to the creation and deletion of containers.

In one embodiment of the invention, each of the one or more CS table entries (302F, 302S) includes a container identifier (304). A container identifier may be a string of characters (e.g., letters, numbers, symbols, etc.) that are used to identify a container. The container identifier may be automatically generated when a container is created, may be chosen or selected when the container is created, and may be changed any time after the container is created. In another embodiment of the invention, the container identifier (304) may be a unique identifier of the container, which distinguishes the container uniquely from other containers. In such an embodiment, the container identifier may be based on a unique identifier of the underlying host (e.g., server) on which the container is executing. Further, in such an embodiment, the container identifier may be rarely changed or modified for the life of the container. As such, the container identifier may be any length and any combination of characters that allows a container to be uniquely identified. By way of an example, a container identifier may be an alphanumeric tag, such as "containerdemo1", given by an administrator or may be a 128-bit integer, created by the CMS, and represented in hexadecimal notation such as:

27 9a 8b 7c 6d 5e 6f ee-4f 3e 2d 1c 0a ce 72 e5

In one embodiment of the invention, each of the one or more CS table entries (302F, 302S) includes a server identifier (306). A server identifier may be a string of characters (e.g., letters, numbers, symbols, etc.) that are used to identify a server. The server identifier may be automatically generated when a server is introduced into a network or datacenter, may be chosen or selected when the server is introduced, and may be changed any time after the server is introduced. In another embodiment of the invention, the server identifier (306) may be a unique identifier of the server, which distinguishes the server uniquely from other servers. In such an embodiment, the server identifier may be rarely changed or modified for the duration the server is integrated into a network or datacenter. As such, the server identifier may be any length and any combination of characters that allows a server to be uniquely identified. By way of an example, a server identifier may be an alphanumeric tag, such as "lnx150", given by an administrator, or may be a 128-bit integer represented in hexadecimal notation similar to the exemplified unique container identifier above.

In one embodiment of the invention, each of the one or more CS table entries (302F, 302S) may include a bridge identifier (not shown). A bridge identifier may be a string of characters (e.g., letters, numbers, symbols, etc.) that are used to identify a bridge (e.g., a vSwitch executing on a server). The bridge identifier may be automatically generated when a bridge (or vSwitch) is created, may be chosen or selected when the bridge is created, and may be changed any time after the bridge is created. In another embodiment of the invention, the bridge identifier may be a unique identifier of the bridge, which distinguishes the bridge uniquely from other bridges executing on a server and/or all servers in a network or datacenter. In such an embodiment, the bridge identifier may be based on a unique identifier of the underlying host (e.g., server) on which the bridge is executing. Further, in such an embodiment, the bridge identifier may be rarely changed or modified for the life of the bridge. As such, the bridge identifier may be any length and any combination of characters that allows a bridge to be uniquely identified. By way of an example, a bridge identifier may be an alphanumeric tag, such as "vswitch0", given by an administrator or may be a 128-bit integer, created by the underlying host, and represented in hexadecimal notation similar to the exemplified unique container identifier above.

Additional and/or alternative information may be included in a CS table entry (302F, 302S) without departing from the invention. For example, the one or more CS table entries may further include layer-4 (L4) port identifiers that are used to bind container ports to respective vSwitches and/or the underlying host hardware (e.g., server).

Figure 3B:
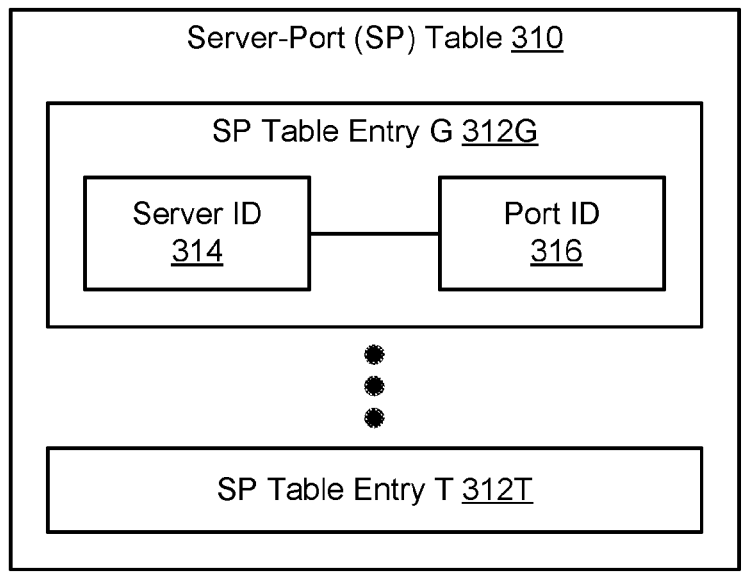
FIG. 3B shows a server-port (SP) table in accordance with one or more embodiments of the invention.

FIG. 3B shows a server-port (SP) table in accordance with one or more embodiments of the invention. The SP table (310) may be implemented in hardware, software, or any combination thereof. Moreover, the SP table may be a database that includes entries, which include mappings between a server and a port of a network element (e.g., network element (102) in FIG. 1). In one embodiment of the invention, a mapping between a server and a port of a network element may be used to identify which servers are directly-attached to a network element; and further, to which physical port of the network element is the server connected. In view of this, the SP table includes one or more SP table entries (312G, 312T). In one embodiment of the invention, a SP table entry may be programmed by a network or datacenter administrator, or by the discovery agent (discussed above) based on the network connectivity information (NCI) known to the administrator or extracted from ingress LLDP and/or CDP packets. That is to say, the SP table (310) may be updated on occasion, by, or more specifically, in response to, the queries/requests submitted by requesting entities, such as the CTS, periodic updating programmed as a functionality of the discovery agent, etc.

In one embodiment of the invention, each of the one or more SP table entries (312G, 312T) includes a server identifier (314). The server identifier in a SP table entry may be substantially similar to the server identifier (306) in a CS table entry (302F, 302S).

In one embodiment of the invention, each of the one or more SP table entries (312G, 312T) includes a port identifier (316). A port identifier may be a string of characters (e.g., letters, numbers, symbols, etc.) that are used to identify a physical port of the network element. The port identifier may be automatically assigned or selected during manufacturing of the network element. By way of an example, a port identifier may be an alphanumeric tag such as "Ethernet13".

Additional and/or alternative information may be included in a SP table entry (312G, 312T) without departing from the invention.

Figure 3C:
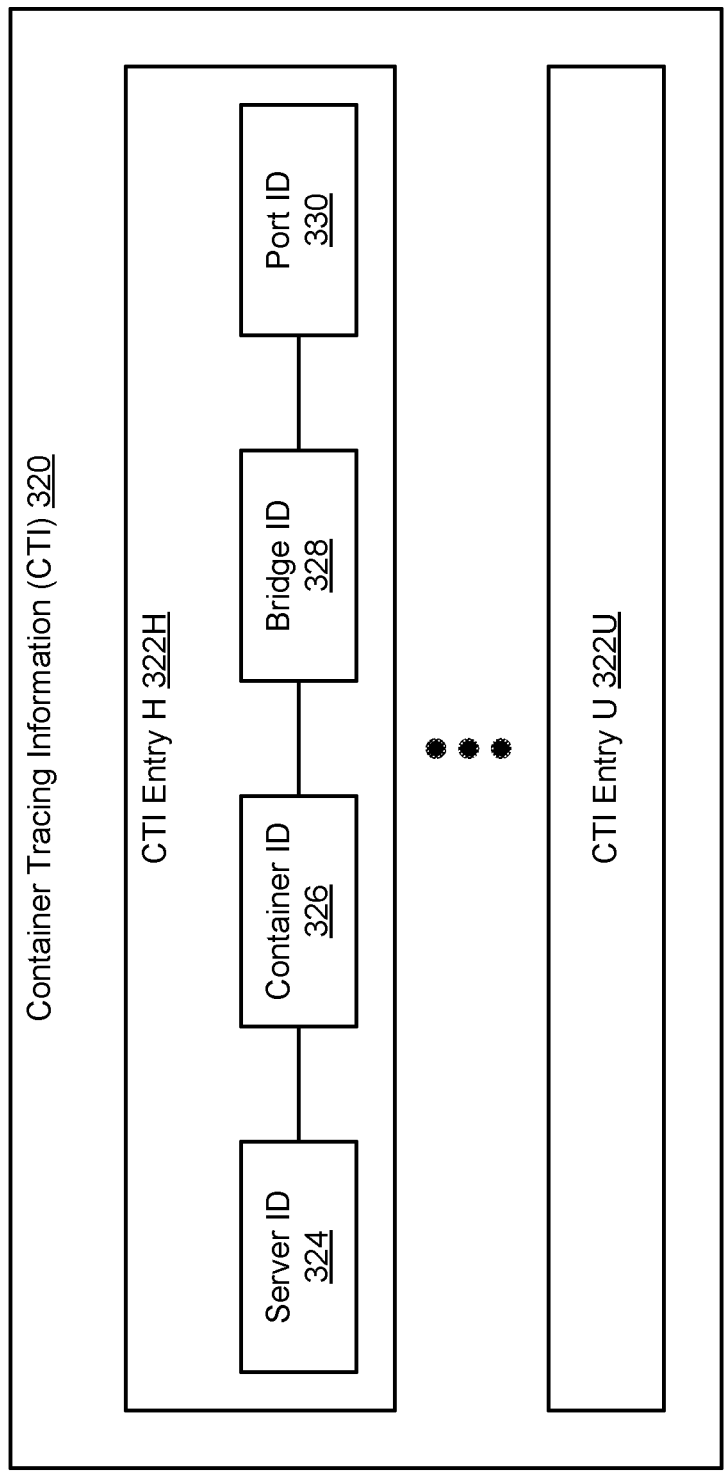
FIG. 3C shows container tracing information (CTI) in accordance with one or more embodiments of the invention.

FIG. 3C shows container tracing information (CTI) in accordance with one or more embodiments of the invention. CTI (320) may be implemented in hardware, software, or any combination thereof. Further, CTI may be a database (or any other data structure) that includes entries, which include mappings between a container and a port of a network element (e.g., network element (102) in FIG. 1). In view of this, CTI includes one or more CTI entries (322H, 322U). In one embodiment of the invention, a CTI entry may be populated by the container tracing service (CTS) based at least on the availability and updating of CS mappings and SP mappings.

In one embodiment of the invention, each of the one or more CTI entries (322H, 322U) includes a server identifier (324), a container identifier (326), a bridge identifier (328) (optional), and a port identifier (330). In one embodiment of the invention, the server identifier (324) is substantially similar to the server identifier (306, 314) included in a CS table entry and SP table entry, respectively. To that extent, a server identifier included in CTI (320) is associated with a server that is directly-attached to the network element. In one embodiment of the invention, the container identifier (326) is substantially similar to the container identifier (304) included in a CS table entry (302F, 302S). As discussed above, the container identifier (326) belongs to a container that is executing on the server associated with the server identifier. In one embodiment of the invention, the bridge identifier (328) is substantially similar to the bridge identifier described above with respect to FIG. 3A. The bridge identifier is associated with a vSwitch executing on the server, associated with the server identifier (324), which provides network access to the container associated with the container identifier (326). In one embodiment of the invention, the port identifier (330) is substantially similar to the port identifier (316) included in a SP table entry (312G, 312T). Substantively, the port identifier pertains to a physical port on the network element to which the server, associated with the server identifier (324), is connected.

Additional and/or alternative information may be included in a CTI entry (322H, 322U) without departing from the invention. For example, the one or more CTI entries may further include bandwidth usage information directed at helping administrators manage load provisioning (or the allocation of containers).

Figure 4A:
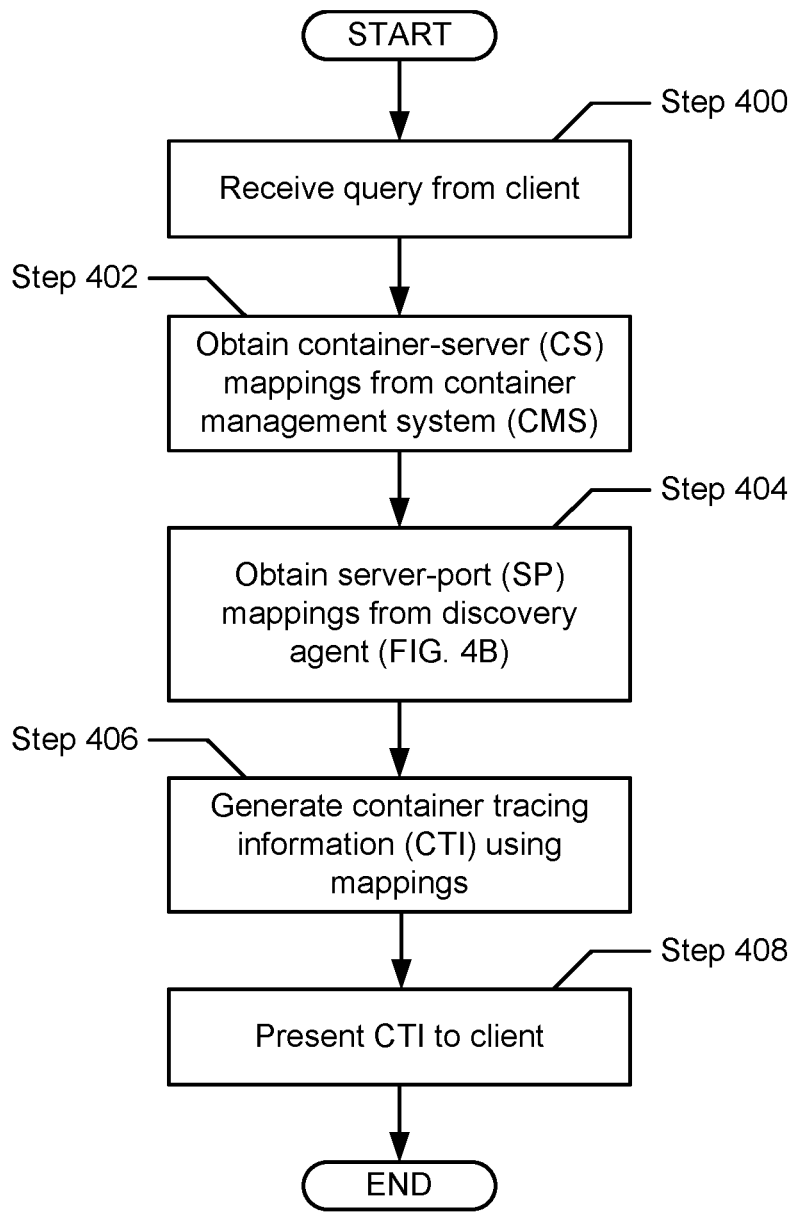
FIG. 4A shows a flowchart that describes a method for presenting container tracing information (CTI) in accordance with one or more embodiments of the invention.
Figure 4B:
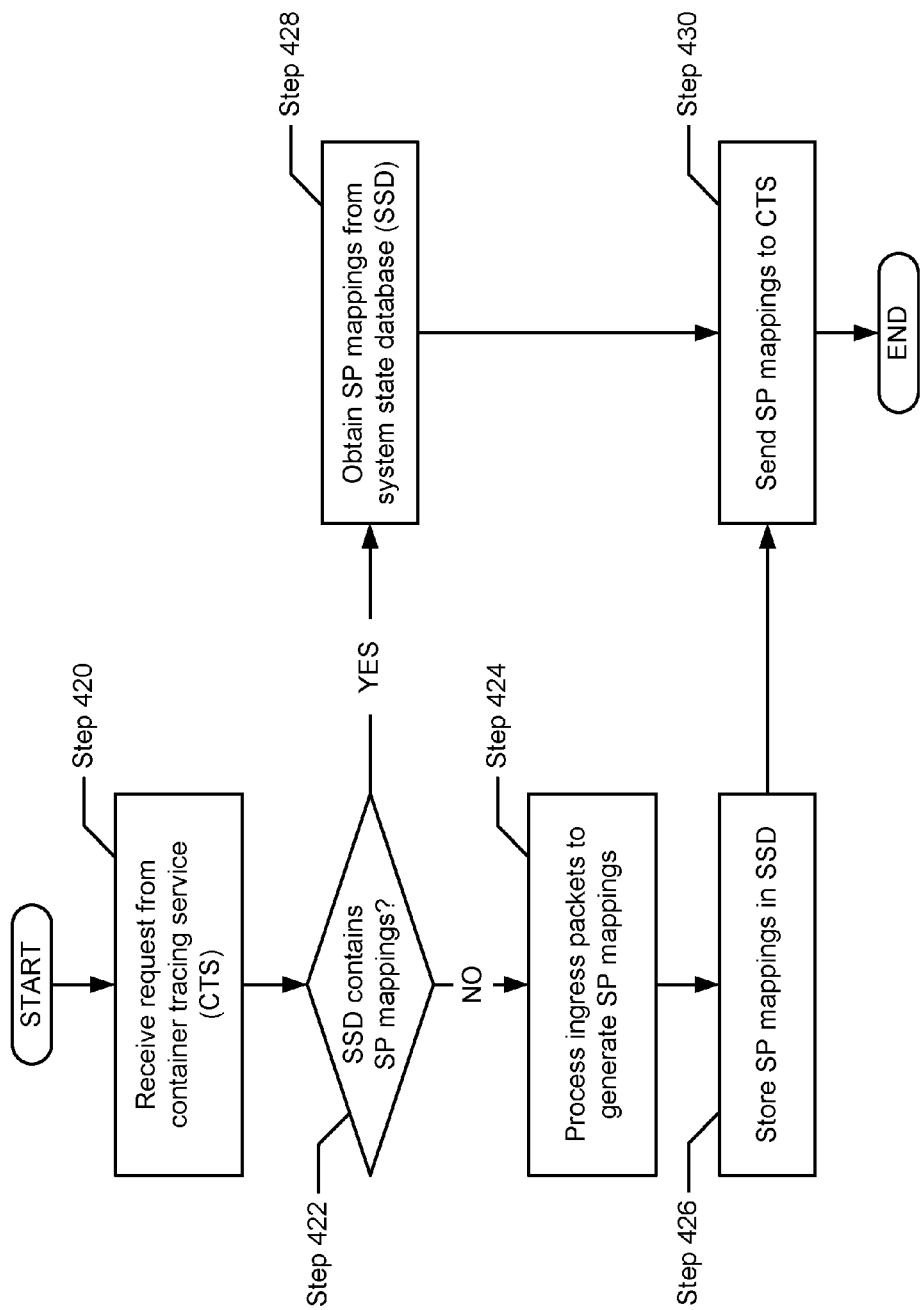
FIG. 4B shows a flowchart that describes a method for obtaining server-port (SP) mappings in accordance with one or more embodiments of the invention.

FIGS. 4A and 4B show flowcharts in accordance with one or more embodiments of the invention. While the various steps in the flowcharts are presented and described sequentially, one or ordinary skill will appreciate that some or all of the steps may be executed in different orders, may be combined or omitted, and some or all steps may be executed in parallel. In one embodiment of the invention, the steps shown in FIGS. 4A-4B may be performed in parallel with any other steps shown in FIGS. 4A-4B without departing from the invention.

FIG. 4A shows a flowchart that describes a method for presenting container tracing information (CTI) in accordance with one or more embodiments of the invention. In Step 400, a query is received from a client. In one embodiment of the invention, the query pertains to requesting information specific to a network element. In one embodiment of the invention, the requested information is container tracing information (CTI) (described above).

In Step 402, container-server (CS) mappings are obtained from the container management system (CMS). In one embodiment of the invention, being that the CMS is a third-party system, a request may be submitted to the CMS to provide the CS mappings for the network or datacenter. Subsequently, in response to the request, the CMS proceeds to provide the CS mappings (e.g., which containers are running in which servers) back to the requesting entity, which in one embodiment of the invention, is the container tracing service (CTS) executing on the management plane of a network element.

In Step 404, server-port (SP) mappings are obtained from the discovery agent residing in the control plane of the network element. In one embodiment of the invention, the CTS may query the discovery agent for the SP mappings, to which the discovery agent provides a response including the SP mappings. The exchange of information between the CTS and the discovery agent may be facilitated through any known or later developed inter-process communication mechanism. Examples of known inter-process communications include, but are not limited to, the implementation of a file, a signal, a socket, a message queue, a pipeline, a semaphore, shared memory, message passing, and a memory-mapped file. Additional details pertaining to Step 404 are described below with respect to FIG. 4B.

In Step 406, CTI is generated using the CS mappings and the SP mappings. In one embodiment of the invention, this involves processing the CS mappings in view of the SP mappings. Towards understanding this, in one embodiment of the invention, from the perspective of the container management system (CMS), containers deployed in a network or datacenter are associated with a server on which a container is running. Said another way, the CMS is unaware of network connectivity information (NCI) which lays out how network infrastructure components (e.g., network elements, servers, etc.) are connected to one another within the network or datacenter. In view of this, though a given network element (or the CTS in a given network element) may submit a request for the CS mappings from the CMS (e.g., Step 402), in one embodiment of the invention, the CMS is incapable of filtering down the CS table (stored in the CMS) into a subset of CS table entries that are pertinent to the given network element. Subsequently, the CS mappings obtained from the CMS are representative of the full CS table, which includes entries pertaining to all containers deployed in the network or datacenter. In other words, the obtained CS mappings include both: (i) containers executing on servers directly-attached to the (requesting) network element; and (ii) containers executing on other servers, which are directly-connected to other (e.g., non-requesting) network elements in the network or datacenter.

In one embodiment of the invention, in order to generate CTI relevant to a network element, only the former subset of containers (discussed above) and the respective servers the subset of containers is executing on are necessary. In one embodiment of the invention, refinement of the CS mappings may be brought about by using the SP mappings. In one embodiment of the invention, SP mappings are specific to the network element in which the SP mappings are stored. Therefore, SP mappings are already tailored to include information relevant to a specific network element. More specifically, the SP mappings, in part, identify the one or more servers that are directly-attached to the specific network element. Further, in identifying CS table entries that include a server identifier that matches a server identifier specified in the SP mappings (e.g., SP table entries), the subset of CS mappings may be obtained. In one embodiment of the invention, this subset of CS mappings correspond to the subset of containers that are relevant to the network element. From here, in one embodiment of the invention, the union of this subset of CS mappings and the SP mappings takes place in order to map particular containers to particular physical ports of the network element.

In Step 408, the CTI, generated in Step 406, is presented (or transmitted) to the client.

In one embodiment of the invention, the CS mappings and the SP mappings may be obtained at periodic intervals by the requesting entity (e.g., the CTS). That is, in one embodiment of the invention, the CMS may push/provide CS mappings, and the discovery agent may push/provide SP mappings, to the requesting entity periodically (e.g., each time a predetermined duration of time has elapsed). In another embodiment of the invention, the CS mappings and the SP mappings may be pushed/provided each time after which an update to the mappings has occurred. As discussed above, updates to the CS mappings may correspond to the creation and/or deletion of containers throughout a network or datacenter. Updates to the SP mappings may correlate to the allotment of different ports on a network element to which a server may be connected. Further, consistent with the obtaining of the CS mappings and the SP mappings at periodic intervals, CTI may be generated and/or pushed/provided to a client periodically (or in response to a request from a client).

FIG. 4B shows a flowchart that describes a method for obtaining server-port (SP) mappings in accordance with one or more embodiments of the invention. In Step 420, a query/request from the CTS is received by the discovery agent. In one embodiment of the invention, the query/request may have been received through one of a variety of inter-process communication mechanisms listed above.

In Step 422, a determination is made, by the discovery agent, with regards to whether or not the system state database (SSD) includes the requested SP mappings. In one embodiment of the invention, the discovery agent may attempt retrieving SP mappings from a designated address or path (for the SP mappings) in the SSD. If the retrieval obtains a null value (or a record with a timestamp older than a predetermined threshold/duration of time), the process proceeds to Step 424; otherwise, if the retrieval obtains a record, representing SP mappings, with a timestamp within the predetermined threshold/duration of time, then the process proceeds to Step 428.

In Step 424, having determined that any or recent SP mappings are not stored in the SSD, the discovery agent processes ingress packets to generate (more current) SP mappings. In one embodiment of the invention, the SP mappings may be generated using the link layer discovery protocol (LLDP) or the Cisco Discovery Protocol (CDP). More specifically, as discussed above, the discovery agent includes functionality to issue and receive bridging packets (e.g., Ethernet or media access control (MAC) frames), through each of the ports on the network element, in accordance with LLDP or CDP. In one embodiment of the invention, the SP mappings are determined using the received LLDP or CDP packets, which, in part, may identify the server that issued the LLDP/CDP packet, and further, the port of that issuing server. This information combined with information about which physical port on the network element, which received the particular LLDP/CDP packet, may be used to determine to which server each port of the network element is connected.

In Step 426, the SP mappings (generated in Step 424) are stored in the SSD. In one embodiment of the invention, storing of the SP mappings may involve the writing of the SP mappings into the SSD at the predetermined address/path designated for the SP mappings.

In Step 428, having determined (via Step 422) that recent SP mappings are stored in the SSD, the discovery agent subsequently obtains the SP mappings from the SSD. In one embodiment of the invention, obtaining the SP mappings may involve the copying of information pertaining to the predetermined address/path in the SSD that is designated for the SP mappings.

In Step 430, the SP mappings, either generated in Step 424 or obtained from the SSD in Step 428, are provided to the container tracing service (CTS) residing in the management plane of the network element. In one embodiment of the invention, this sending of the SP mappings from the control plane to the management plane may be facilitated, for example, through one of the above-listed inter-process communication mechanisms.

FIGS. 5A-5G show various aspects associated with an example in accordance with one or more embodiments of the invention. The following example is for explanatory purposes only and not intended to limit the scope of the invention.

FIG. 5A shows an example system in accordance with one or more embodiments of the invention. The example system (500) includes a datacenter (502), a container management system (CMS) (504), and a client (e.g., a computing system operated by the datacenter administrator) (506). In the example, these components are operatively connected through a network (508). Further, though not shown, the CMS (504) manages, and thus is operatively connected to, a number of containers deployed throughout the datacenter (502). The client (506) is unaware of the CMS (504), and therefore, communicates solely with network elements within the datacenter (502).

Figure 5B:
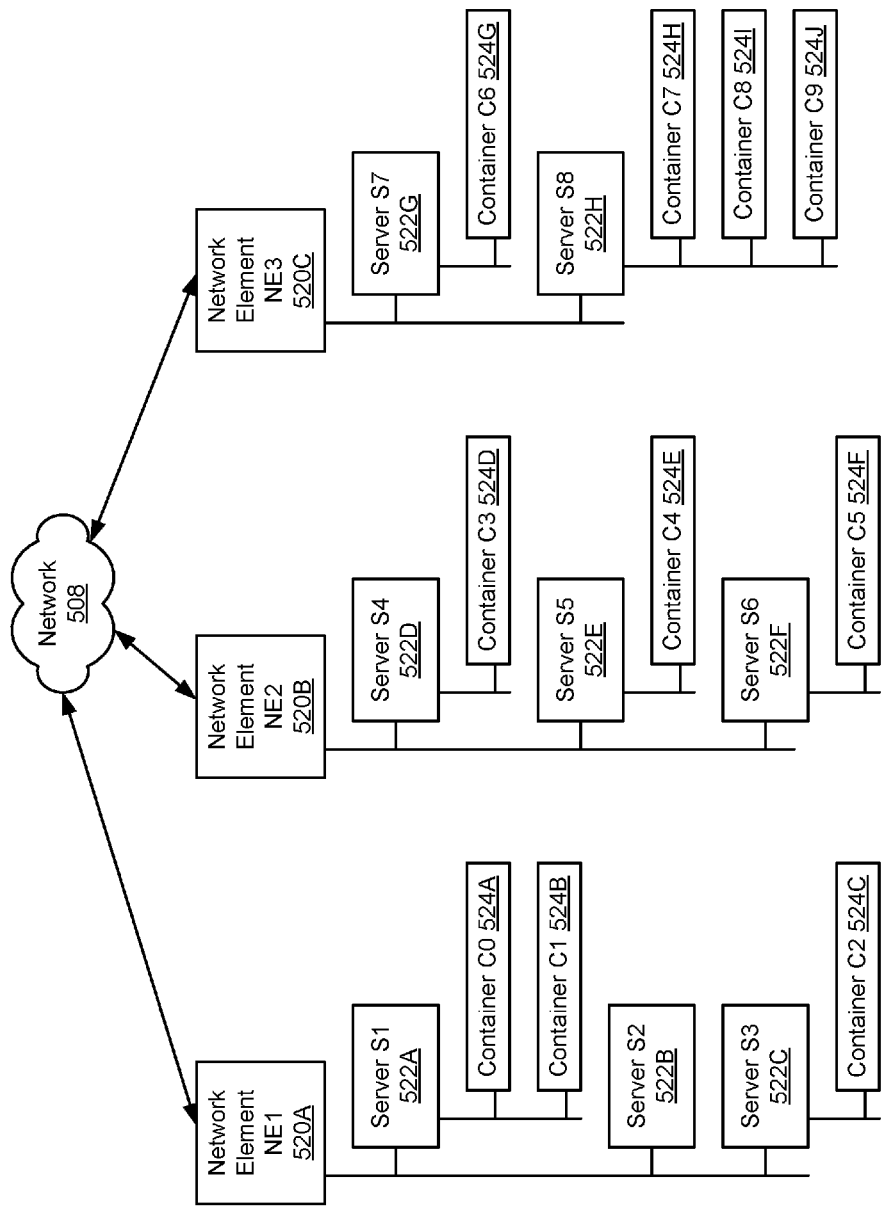
FIG. 5B shows the network topology for an example datacenter in accordance with one or more embodiments of the invention.

FIG. 5B shows a network topology for an example datacenter in accordance with one or more embodiments of the invention. In the example, the datacenter (502) includes three Network Elements—NE1 (520A), NE2 (520B), and NE3 (520C). The three network elements are operatively connected to each other and other components of the example system (see e.g., FIG. 5A) through a network (508).

According to the network topology, Servers S1 (522A), S2 (522B), and S3 (522C) are directly-attached to Network Element NE1 (520A). Executing on Server S1 (522A) are Bridges B1 and B2 (not shown), as well as Containers C0 (524A) and C1 (524B). No bridges, nor containers, are executing on Server S2 (522B). Executing on Server S3 (522C) are Bridge B3 (not shown) and Container C2 (524C).

Further to the network topology, Servers S4 (522D), S5 (522E), and S6 (522F) are directly-attached to Network Element NE2 (520B). Executing on Server S4 (522D) are Bridge B4 (not shown) and Container C3 (524D). Executing on Server S5 (522E) are Bridge B5 (not shown) and Container C4 (524E). Additionally, executing on Server S6 (522F) are Bridge B6 (not shown) and Container C5 (524F).

Lastly, Servers S7 (522G) and S8 (522H) are directly-attached to Network Element NE3 (520C). Accordingly, executing on Server S7 (522G) are Bridge B7 (not shown) and Container C6 (524G). Executing on Server S8 (522H) are Bridges B7, B8, and B9 (not shown), and Containers C7 (524H), C8 (524I), and C9 (524J).

FIG. 5C shows an example container-server (CS) table in accordance with one or more embodiments of the invention. More specifically, the example CS table shown in FIG. 5C lists the CS table entries (or CS mappings) that are stored on the CMS (504) of the example system (500). The example CS table (530) includes entries consistent with the network topology of the example datacenter (502) presented in FIG. 5B. In one embodiment of the invention, the number of CS table entries equal the number of containers deployed in the example datacenter (502). Each CS Table Entry (532A-532J) includes information mapping one of the containers to a server (522A-522H) in the example datacenter (502). By way of an example in describing the contents of a CS Table Entry, CS Table Entry 1 (532A), which corresponds to Container C0 (524A), includes a Container C0 ID (534A), a Server S1 ID (536A), and a Bridge B1 ID (538A). In one embodiment of the invention, CS Table Entry 1 (532A) shows that Container C0 (524A) (associated with Container C0 ID (534A)) is executing on, and is therefore mapped to, Server S1 (522A) (associated with Server S1 ID (536A)). Further, CS Table Entry 1 (532A) shows that Bridge B1 (not shown) (associated with Bridge B1 ID (538A)) is executing, and is therefore mapped to, Server S1 (522A) (associated with Server S1 ID (536A)). Further still, CS Table Entry 1 (532A) shows that Bridge B1 (not shown) is providing network access to Container C0 (524A).

Figure 5F:
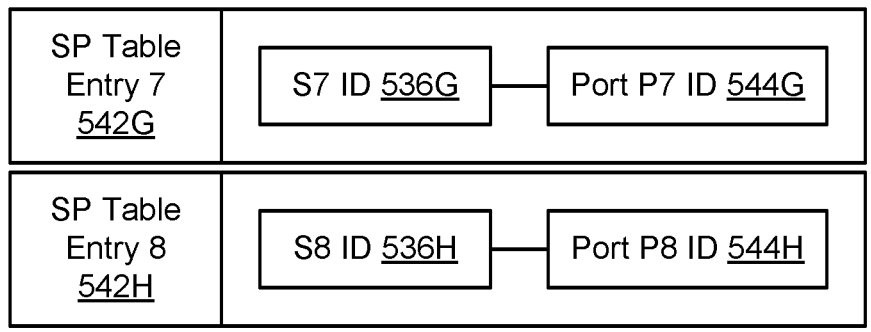
FIG. 5F shows an example server-port (SP) table for a third network element in accordance with one or more embodiments of the invention.

FIGS. 5D-5F show example server-port (SP) tables for the three network elements, respectively, in accordance with one or more embodiments of the invention. More specifically, FIG. 5D shows SP Table 1 (540A) for Network Element NE1 (520A); FIG. 5E shows SP Table 2 (540B) for Network Element NE2 (520B); and FIG. 5F shows SP Table 3 (540C) for Network Element NE3 (520C). In one embodiment of the invention, each of the SP tables may be generated by the discovery agent, and/or stored in the system state database (SSD), residing in their respective network elements. In one embodiment of the invention, each SP table includes one or more SP Table entries (e.g., 542A, 542B, 542C), which includes information mapping a server directly-attached to the respective network element (e.g., 520A) via a specified physical port (not shown) of the respective network element. By way of an example in describing the contents of an SP Table Entry, SP Table Entry 1 (542A) (corresponding to Server S1 (522A)) includes a Server S1 ID (536A) and a Port P1 ID (544A). In one embodiment of the invention, SP Table Entry 1 (542A) shows that Server S1 (522A) (associated with Server S1 ID (536A)) is connected to Port P1 (not shown) (associated with Port P1 ID (544A)). In one embodiment of the invention, Port P1 may correspond to a physical port of the respective network element, or Network Element NE1 (520A).

Figure 5G:
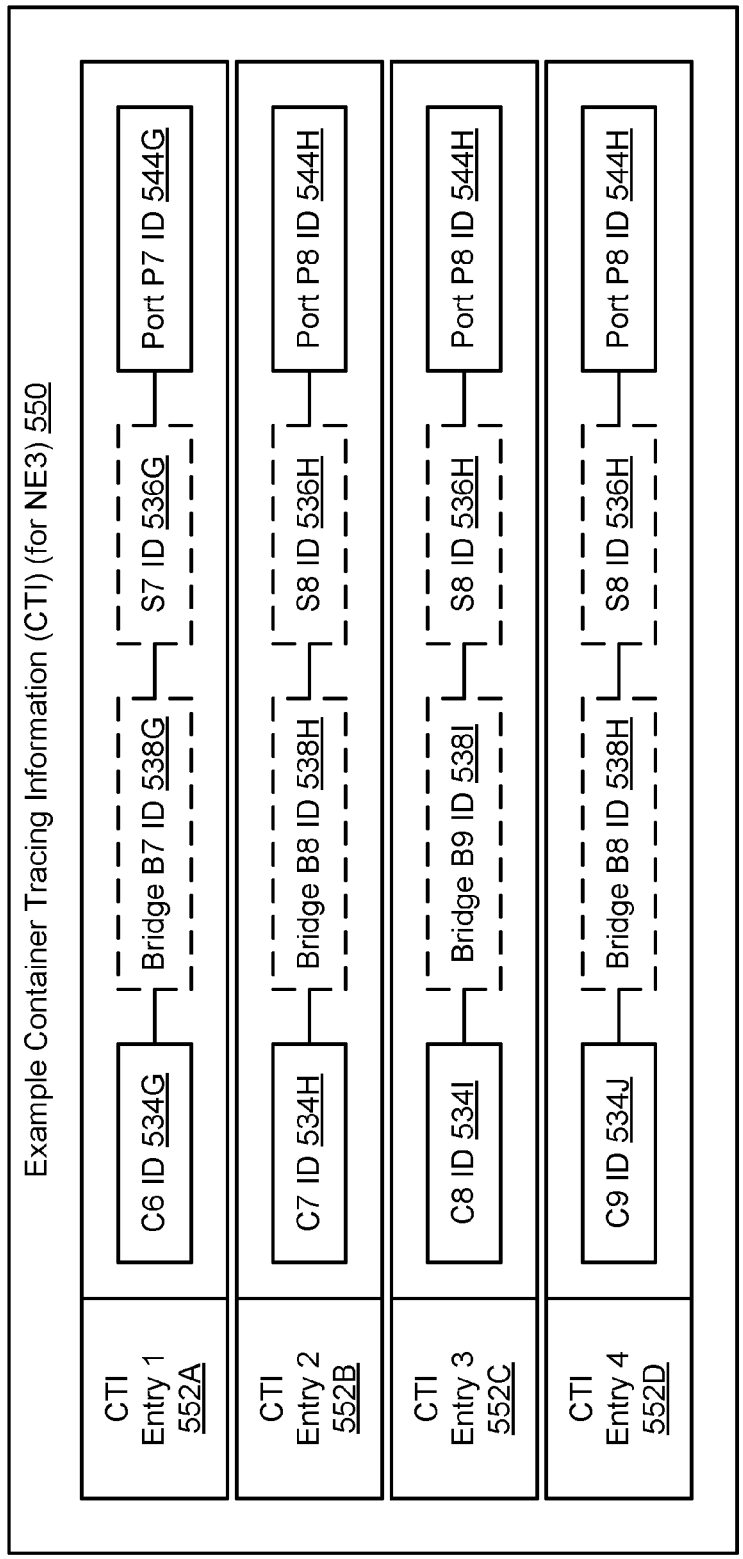
FIG. 5G shows example container tracing information (CTI) for a third network element in accordance with one or more embodiments of the invention.

FIG. 5G shows example container tracing information (CTI) in accordance with one or more embodiments of the invention. Following the example, FIG. 5G more specifically shows CTI that may be generated by the container tracing service (CTS) of Network Element NE3 (520C). In one embodiment of the invention, the example CTI (550) includes four CTI Entries (552A-552D). Each CTI Entry may correspond to a container executing on a server directly-attached to Network Element NE3 (520C). Further, each CTI Entry includes information that combines a subset of the CS mappings of FIG. 5C and the SP mappings (pertaining to Network Element NE3) of FIG. 5F. In one embodiment of the invention, the combined information maps a container (executing on a server directly-attached to Network Element NE3) to a physical port associated with Network Element NE3. By way of an example in describing the contents of a CTI Entry, CTI Entry 1 (552A), which corresponds to Container C6 (524G), includes a Container C6 ID (534G), a Bridge B7 ID (538G), a Server S7 ID (536G), and a Port P7 ID (544G). With this mapping of information, CTI Entry 1 (552A) discloses that Container C6 (524G) (associated with Container C6 ID (534G)) is operatively connected to Bridge B7 (not shown) (associated with Bridge B7 ID (538G)), which are both executing on Server S7 (522G) (associated with Server S7 ID (536G)). CTI Entry 1 (552A) further discloses that Server S7 (522G) is connected to Network Element NE3 (520C) at Port P7 (not shown) (associated with Port P7 ID (544G)). Accordingly, Container C6 (524G) maps to Port P7 (not shown), which may be one of the physical ports of Network Element NE3 (520C).

FIG. 6 shows a computing system in accordance with one or more embodiments of the invention. Embodiments of the invention may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network element, comprising:
a data plane comprising a plurality of ports;
a control plane operatively connected to the data plane, wherein the control plane comprises a discovery agent; and
a management plane operatively connected to the control plane, wherein the management plane comprises a container tracing service (CTS) programmed to:
receive, at a first port of the plurality of ports, a query from a client;
obtain, using a second port of the plurality of ports, a first set of mappings from a container management system (CMS);
obtain a second set of mappings from the discovery agent;
generate container tracing information (CTI) using the first set of mappings and the second set of mappings; and
present, using the first port of the plurality of ports, the CTI to the client.

2. The network element of claim 1, wherein to obtain the first set of mappings from the CMS, the CTS is further programmed to:
submit a request to the CMS; and
receive, in response to the request, the first set of mappings.

3. The network element of claim 1, wherein the control plane further comprises a system state database (SSD) operatively connected to the discovery agent, and wherein to obtain the second set of mappings from the discovery agent, the CTS is further programmed to:
submit a request to the discovery agent; and
receive, in response to the request, the second set of mappings.

4. The network element of claim 3, wherein the discovery agent, in response to receiving the request, is programmed to:
make a determination that the SSD comprises the second set of mappings;
obtain, based on the determination, the second set of mappings from the SSD; and
provide the second set of mappings to the CTS.

5. The network element of claim 3, wherein the discovery agent, in response to receiving the request, is programmed to:
process a subset of ingress packets to generate the second set of mappings; and
provide the second set of mappings to the CTS.

6. The network element of claim 5, wherein the subset of ingress packets comprise packets used in one selected from a group consisting of a link layer discovery protocol (LLDP) and a Cisco Discovery Protocol (CDP).

7. The network element of claim 1, wherein to generate the CTI using the first set of mappings and the second set of mappings, the CTS is further programmed to:
reduce, using the second set of mappings, the first set of mappings to obtain a subset of the first set of mappings; and combine the subset of the first set of mappings and the second set of mappings to obtain a third set of mappings, wherein the CTI comprises at least the third set of mappings.

8. The network element of claim 7, wherein to reduce, using the second set of mappings, the first set of mappings to obtain the subset of the first set of mappings, the CTS is further programmed to:
obtain, from each mapping of the second set of mappings, a first component identifier to obtain a set of first component identifiers; and
identify the subset of the first set of mappings using the set of first component identifiers, wherein each mapping of the subset of the first set of mappings corresponds to a mapping of the first set of mappings that comprises a second component identifier matching one first component identifier in the set of first component identifiers.

9. The network element of claim 8, wherein the first component identifier and the second component identifier are associated with a server that is directly-attached to the network element.

10. The network element of claim 1, wherein the first set of mappings is a container-server (CS) table, wherein the CS table comprises at least one CS table entry, wherein the at least one CS table entry comprises information relating a container and a server.

11. The network element of claim 10, wherein the information comprises at least a container identifier associated with the container and a server identifier associated with the server.

12. The network element of claim 1, wherein the second set of mappings is a server-port (SP) table, wherein the SP table comprises at least one SP table entry, wherein the at least one SP table entry comprises information relating a server and a port of the plurality of ports.

13. The network element of claim 12, wherein the information comprises at least a server identifier associated with the server and a port identifier associated with the port.

14. The network element of claim 1, wherein the CMS is a third-party system.

15. The network element of claim 1, wherein the discovery agent is a process executing on the network element, wherein the discovery agent is associated with one selected from a group consisting of a link layer discovery protocol (LLDP) and a Cisco Discovery Protocol (CDP) employed on the network element.

16. The network element of claim 1, wherein the CTI comprises at least a third set of mappings, wherein the third set of mappings comprises at least one CTI entry, wherein the at least one CTI entry comprises information relating a container and a port of the plurality of ports.

17. The network element of claim 16, wherein the information comprises at least a container identifier associated with the container and a port identifier associated with the port.

18. The network element of claim 1, wherein the network element is one selected from a group consisting of a switch, a router, and a multilayer switch.

19. A method for presenting container tracing information (CTI) associated with a network element, comprising:
receiving a query from a client;
obtaining a first set of mappings from a container management system (CMS);
obtaining a second set of mappings from a discovery agent;
generating the CTI using the first set of mappings and the second set of mappings; and
presenting the CTI to the client.

20. A non-transitory computer readable medium comprising computer readable program code, which when executed by a processor enables the processor to:
receive a query from a client;
obtain a first set of mappings from a container management system (CMS);
obtain a second set of mappings from a discovery agent;
generate container tracing information (CTI) using the first set of mappings and the second set of mappings; and
present the CTI to the client.

* * * * *